Nov. 23, 1971     C. L. ZUCK, JR     3,621,810
CORROSION DETECTOR
Filed Nov. 5, 1970
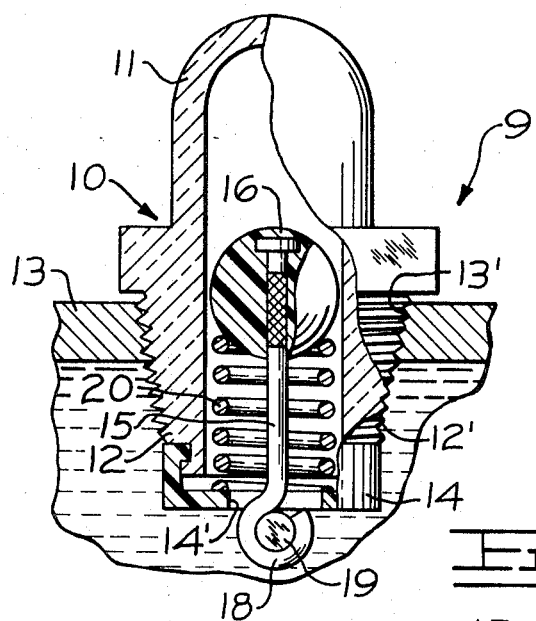
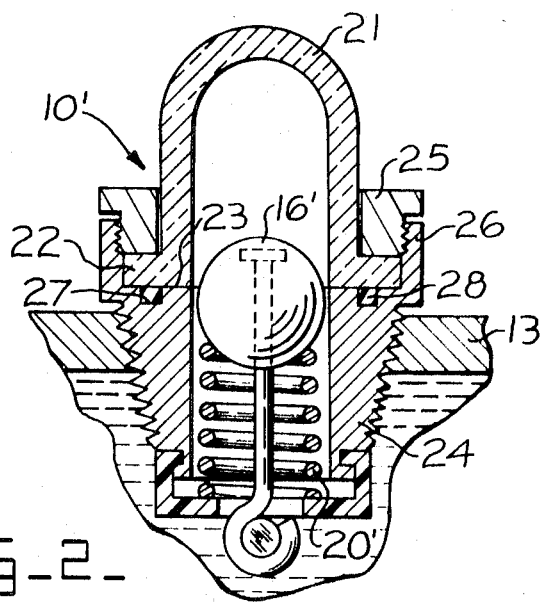
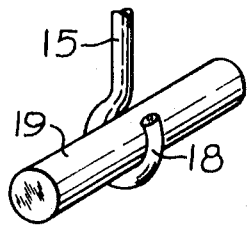
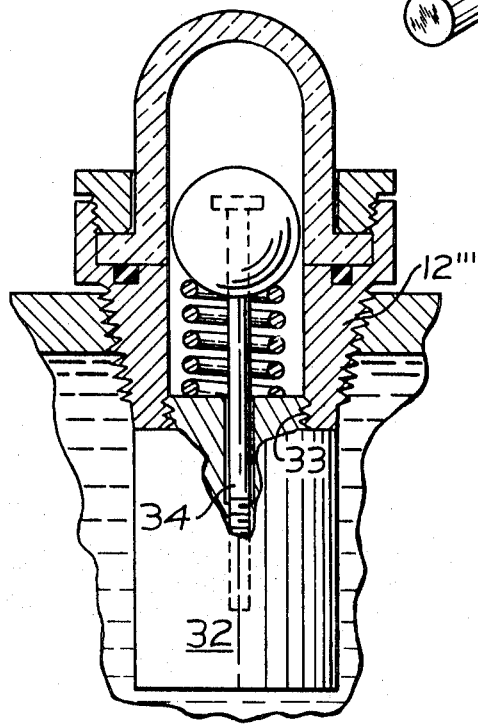
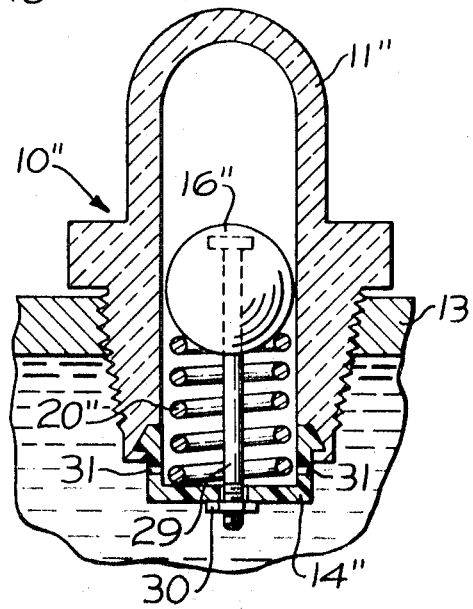
*INVENTOR*
CHARLES L. ZUCK, JR.
BY
*ATTORNEYS*

United States Patent Office 3,621,810
Patented Nov. 23, 1971

3,621,810
CORROSION DETECTOR
Charles L. Zuck, Jr., Washington, Ill., assignor to Caterpillar Tractor Co., Peoria, Ill.
Filed Nov. 5, 1970, Ser. No. 87,083
Int. Cl. G01k 1/02
U.S. Cl. 116—114.5      10 Claims

ABSTRACT OF THE DISCLOSURE

A detector for visually indicating the occurrence of significant corrosion in a pipe has an indicator held in a non-visible position against a spring by a corrodible member which is exposed to the fluid in the pipe. Corrosive destruction of the corrodible member releases the indicator to a visible position, where it serves as a visual signal that corrective measures are needed.

BACKGROUND OF THE INVENTION

This invention relates to a device for detecting corrosion activity in a fluid system such as a pipe.

Corrosion in a fluid system is a common problem which may cause serious damage to costly equipment unless corrective measures are taken. Destructive corrosion may proceed from various causes ranging from simple rusting to the inadvertent introduction of a chemically active fluid into a system which was not designed to resist chemical attack. Still another common form of corrosion results from the establishment of an effective electrochemical cell wherein the pipe becomes the anode, and is thus destroyed. To prevent such corrosion of the pipe, it is common to either maintain the pH of the fluid at 7 to prevent electrolytic action in the system, or to introduce an anodic member, sometimes called a "reducer," into the system to render the pipe cathodic.

In the past, both methods of electrochemical corrosion control have required a regular schedule of preventative maintenance to maintain such systems. Periodic treatment of the fluid to maintain a pH 7, or periodic replacement of anodic members upon their destruction is performed on the basis of estimated average corrosion rates. This often results in wasted maintenance time and material, or damage to the system, when the corrosion rate is less or greater than that anticipated. These procedures and control measures for other forms of corrosion can be greatly facilitated by the use of low cost reliable indicator devices for signaling the presence of significant corrosion within a system.

The present invention is a detector having a non-visible portion communicated with a pipe or other fluid container in which corrosion may occur and also having a visible portion. A visual indicator element is initially held in the non-visible portion of the detector by a corrodible retainer member which is exposed to the fluid while spring means or the like exert a force tending to shift the indicator to the visible region.

In the presence of corrosion, the corrodible member is destroyed, releasing the indicator which then shifts to the visible portion of the detector to provide a visible signal that corrective measures are needed.

In a continuously corrosive system, the retainer member may be a relatively large anodic member, which renders the pipe cathodic, and thereby prevents corrosion of the pipes or the like. The corrosive liquid erodes the anodic member instead of the pipe. When the anodic member has been corrosively destroyed, the indicator is released to the visible position to indicate that the anodic member should be replaced.

Accordingly, it is an object of this invention to provide a small, compact and inexpensive device which gives a visual signal of a significant corrosion in a fluid system.

The invention, together with further object and advantages thereof, will best be understood by reference to the following description of preferred embodiments in conjunction with the accompanying drawings.

BRIEF DESCRIPTION OF THE DRAWINGS

In the accompanying drawings:

FIG. 1 is a broken out view, partially in axial section, of one embodiment of a corrosion detector according to the present invention;

FIG. 2 is a perspective view clarifying the structure of certain elements of the detector shown in FIG. 1;

FIG. 3 is an axial sectional view of another embodiment of the corrosion detector;

FIG. 4 is an axial sectional view of still another embodiment of the detector and FIG. 5 is an axial sectional view of an embodiment of the detector which initially prevents corrosion of a piping system or the like.

DESCRIPTION OF THE PREFERRED EMBODIMENT

Referring initially to FIG. 1 of the drawings, a corrosion detector 9 in accordance with the invention may have a tubular capsule 10 with a closed outer end portion 11 formed at least in part of transplant material and having an open inner end portion 12 which is provided with threads 12' so that the inner end may be threadably engaged in threaded opening 13' in the wall of a pipe 13 or the like which contains a fluid wherein corrosion is to be detected. Thus the interior region of the capsule 10 is communicated with the interior of the pipe and the inner end portion 12 constitutes a relatively non-visible portion, while the outwardly extending outer end portion 11 defines a relatively visible region. Within pipe 13 an annular cap 14 with a central opening 14' is attached to the inner end of capsule 10 to form a partial enclosure.

A pin 15 extends axially within the capsule 10 and has a ball 16 secured to one end thereof, the ball being a visual indicator member and therefore preferably being brightly colored so that it will be readily visible if moved to the outer end 11 of capsule 10.

In the non-indicating condition, the other end 18 of pin 15 extends through opening 14' of cap 14 and has a hook configuration to engage a corrodible retainer member 19. Corrodible retainer member 19 in this example of the invention has a rod shape, best seen in reference to FIG. 2 in conjunction with FIG. 1, and extends transversely relative to pin 15 in abutment with cap 14 to hold the indicator ball 16 in the relatively non-visible portion 12 of capsule 10. A compression spring 20 is disposed within the inner portion 12 of capsule 10 and acts between cap 14 and ball 16 to exert a force tending to urge the ball into the visible outer region 11 of the capsule. Initially, spring 20 is unable to move the ball 16 to the visible position as retainer member 19 acting through pin 15 holds the spring in compression.

The retainer member 19 is formed of a material which will be corrosively attacked if the material of the fluid system such as pipe 13 is also being attacked or is subject to attack when the retainer member 19 material is exhausted. Where electrochemical corrosion is the primary concern, the retainer member 19 may be formed of the material which is anodic with respect to the material in pipe 13. Thus when corrosion of the retainer member 19 has progressed to a certain point, the member is unable to hold ball 16 against the force of spring 20. The member 19 fractures at this time whereupon spring 20 drives the ball to the outer visible end of capsule 10. The need for maintenance measure is then apparent from a casual inspection of the exterior of the detector 9.

FIG. 3 shows a modified capsule construction wherein the visible indicator and non-visible plug portions are are constructed of different materials. The simplest and cheapest way of making the cororsion detector is to construct the capsule entirely of plastic. However, if the fluid monitored has a high temperature, it may be desirable to construct the non-visible portion of the capsule of a material, such as metal, which has a coefficient of expansion similar to that of the pipe, to avoid leakage. Also, plastic tends to discolor when it is exposed to minerals, oil or fumes. Thus, it may be desirable to construct the visible portion of the capsule of glass.

In FIG. 3 a transparent indicator portion 21 of capsule 10' includes a flange 22 which is held in engagement with a seat 23 on a plug part 24 by an annular retainer ring 25 which ring is in threaded engagement with a flange 26 on the plug part 24. The seat 23 on plug 24 includes an annular groove 27 which is provided with a seal 28 to prevent leakage from the capsule.

Other portions of the detector may be utilized as the corrodible element which eventually releases the indicator. FIG. 4, for example, illustrates a detector essentially similar to that of FIG. 1 except that the inner end of the pin 29 which holds ball 16'' against spring 20'' is threaded and a nut 30 is engaged thereon to hold ball 16'' away from the visible region 11'' of capsule 10''. The pin 29 itself is the corrodible member. Cap 14'' is provided with orifices 31 which insure that liquid in the pipe 13 may freely enter the capsule. If the liquid is corrosive, the pin 29 will be destroyed, releasing the colored ball 16''.

FIG. 5 shows another embodiment of the invention that may be employed in a continuously corrosive system to indicate depletion of an anodic slug used to render the pipe cathodic. The embodiment of the invention may be essentially similar to that of FIG. 3 except that the corrodible element is a relatively large mass or slug 32 of anodic material such as zinc or magnesium, attached by threads 33 to the inner end portion 12''' of the capsule. The ball holding pin 34 is threaded into the slug 32 at approximately the center thereof. When the slug 32 has been substantially depleted by corrosive erosion, the pin will be released and the coolred ball will move to the transparent visible indicator portion of the capsule, giving the visual indication that the anodic slug has been depleted and should be replaced to forestall corrosion of other elements of the fluid system.

It will be apparent that variations in the described construction are possible and the constructions shown are not intended to limit the invention except as defined in the following claims.

What is claimed is:

1. A device for detecting corrosive conditions in a fluid containing system comprising indicator means movable from a non-indicating position to an indicating position, a corrodible member retaining said indicator means in the non-indicating position, means urging the indicator means to the indicating position upon corrosive destruction of said corrodible member said non-indicating and indicating positions of said indicator means being defined by separate regions within a capsule, said indicator means being disposed and held in said non-indicating region within the capsule by said corrodible member.

2. The combination of claim 1 wherein said means for urging said indicator means to said indicating position is a spring acting against said indicator means.

3. The combination of claim 1 wherein said capsule is provided with fastening means for attachment of said capsule at an opening in a wall of said fluid system with said indicating region defining a portion of said capsule extending outwardly from said wall.

4. The combination of claim 1 wherein at least part of the capsule defining said indicating position is transparent.

5. The combination of claim 4 wherein said indicator means is a ball having a coloration which contrasts with the apparent color of said indicating region of said capsule in the absence of said ball.

6. The combination of claim 1 wherein the indicating portion of the capsule is formed of transparent material and the non-indicating portion of the capsule is formed of opaque material.

7. The combination of claim 1 further comprising a cap attached to the end of said capsule which forms said non-indicating region; a pin having a first end attached to the indicator means and a second end retained at the cap by a retainer member; wherein at least one of the pin and the retainer member is said corrodible member.

8. The combination of claim 7 wherein the retainer member is a bar of corrodible material disposed externally and transversely of the cap, and the second end of the pin forms a hook which extends through an opening in the cap and engages the corrodible retainer member.

9. The combination of claim 7 wherein said pin is comprised of anodic material, and said cap has at least one orifice therein for transmitting said fluid to the region of said pin.

10. The combination of claim 7 wherein said retainer member is a volume of material of a type which is anodic relative to the material of said fluid systems whereby corrosion is confined to said volume of material and said indicator means is released to said indicating position upon exhaustion of said anodic material.

References Cited

UNITED STATES PATENTS

| | | | |
|---|---|---|---|
| 2,283,954 | 5/1942 | Schroeder et al. | 73—86 |
| 2,510,663 | 6/1950 | Schuessler | 116—118 X |
| 2,701,183 | 2/1955 | Powers, Jr., et al. | 23—253 |
| 2,972,248 | 2/1961 | Gerhardt | 73—86 |
| 3,102,419 | 9/1963 | Schaschl | 116—114 X |
| 3,352,149 | 11/1967 | Sherlock et al. | 73—86 |

LOUIS J. CAPOZI, Primary Examiner

U.S. Cl. X.R.

23—253; 73—86; 116—114